Aug. 14, 1928.

W. H. T. HOLDEN 1,680,377

ALTERNATING POTENTIAL GENERATOR

Filed Nov. 17, 1924

INVENTOR
W. H. T. Holden
BY
ATTORNEY

Patented Aug. 14, 1928.

1,680,377

UNITED STATES PATENT OFFICE.

WILLIAM H. T. HOLDEN, OF BROOKLYN, NEW YORK, ASSIGNOR TO AMERICAN TELEPHONE AND TELEGRAPH COMPANY, A CORPORATION OF NEW YORK.

ALTERNATING POTENTIAL GENERATOR.

Application filed November 17, 1924. Serial No. 750,492.

This invention relates to electrical converting apparatus, and particularly to means for deriving an alternating potential from a direct current potential, or for deriving an alternating current of one frequency from a similar current of different frequency.

Various means have been proposed heretofore for producing alternating potentials from direct current potentials by charging a condenser from a direct current source, and allowing the condenser to discharge through a gap in parallel therewith, whereby oscillations would be set up by the discharge. Such arrangements, however, have had limitations, the principal one of which resided in the relatively high potential necessary to break down the gas between the electrodes constituting the gap.

One of the objects of this invention is to produce an alternating potential from a direct current potential by an arrangment employing a hot cathode gas-filled discharge device capable of operating upon relatively low potentials.

Figures 1, 2:
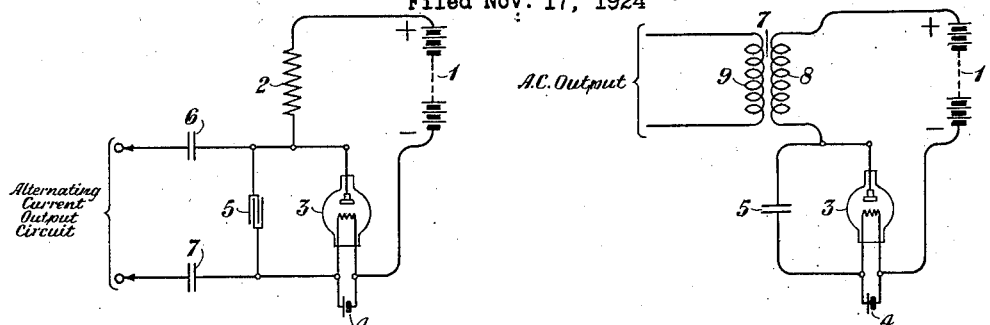
Figure 3:
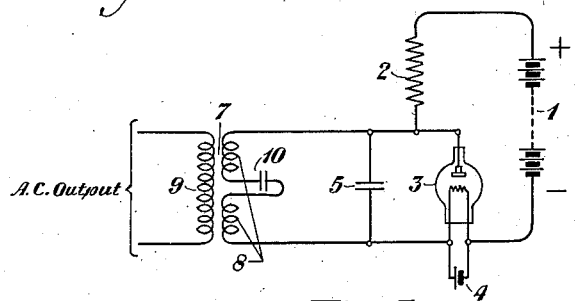
Figure 4:
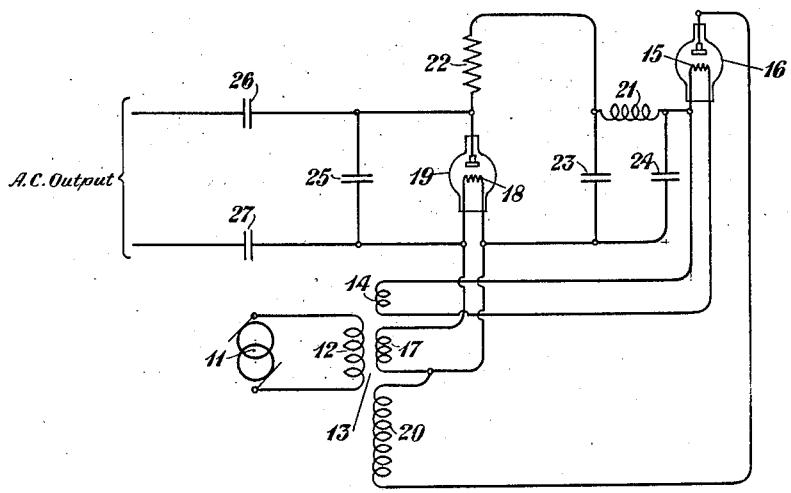

Other objects of this invention will be apparent from the following description, when read in connection with the attached drawing of which Figure 1 shows schematically a simple form of embodiment of the invention; Figs 2 and 3 are variations of the form shown in Fig. 1; and Fig. 4 shows a frenquency converting system.

In Fig. 1, a source of direct current potential 1, which, for example, may be a battery, direct current generator or other similar device and in magnitude from 24 to 48 volts, has its positive terminal connected with the impedance 2, the other terminal of which is connected with the anode of the electrical discharge device 3 and also with one of the terminals of the condenser 5. The negative terminal of the direct current source 1 is connected with the cathode of the device 3, which is heated from any suitable source such as the battery 4. The cathode is also connected with the condenser 5 so that the condenser and the discharge device are in parallel. The alternating current output circuit is connected across the terminals of the condenser 5, the connection including the condensers 6 and 7, which prevent the direct current from the source 1 from flowing over the output circuit.

The discharge tube is of the hot cathode gas-filled type. The manner in which this circuit operates to produce the alternating voltage will probably be obvious. The direct current voltage of the source 1 will be impressed across the impedance 2, and the tube 3 and the condenser 5 in parallel. It will be seen that as long as the voltage at the tube terminals is too low to produce an appreciable discharge therethrough the condenser will charge up by the flow of current from the source 1 through the impedance 2. When the voltage at the tube terminals rises to the value required to start an arc a considerable current will flow through the tube. As this current increases the drop in potential in the impedance 2 also increases. When this drop reaches a value so as to reduce the voltage acros the electrodes of the tube below a certain critical value, the discharge therethrough will no longer be sustained. After the arc has been established the condenser 5 will begin to discharge and a portion of the current through the device 3 will be supplied by the condenser. When the discharge ceases the condenser 5 will again be charged through the impedance 2 until the voltage across the device 3 reaches a break-down value, when the cycle of operation will be repeated. The voltage across the output circuit is of an alternating character, following the voltage changes of condenser 5.

This process obviously requires that the initial break-down potential to start the arc shall be higher than the voltage required to maintain the arc after it has started, and the amount of alternating current energy that can be secured from such a device will depend on the difference between the voltage required to start the arc and the minimum voltage at which the arc can be maintained. I have found that discharge tubes employing thoriated tungsten filaments which had been activated by the vaporization of magnesium require very low voltages to maintain the arc in comparison with the tubes having non-thoriated filaments. In order to secure the most efficient operation of a discharge device of this type it is believed that a tube containing pure helium at a pressure of from 50 to 75 millimeters of mercury and having a thoriated tungsten cathode activated by magnesium, as above described, and a graphite anode would render it possible to start the discharge by a potential in the neighborhood of 20 volts and to maintain the arc by a potential as low as five or six volts. The starting and maintenance voltages of other tubes is considerably greater than those mentioned above.

The arrangements shown in Figs. 2 and 3 illustrate mainly other ways of connecting the output circuit with the converting circuit. Thus in Fig. 2 the alternating current output circuit is connected with the converting circuit by the transformer 7 which has its primary winding 8 connected with the converting circuit and the secondary winding 9 with the output circuit. The transformer 7 simulates the impedance 2 of Fig. 1. Fig. 3 shows a method for coupling the alternating current output circuit with the converting circuit, the coupling transformer being connected across the condenser 5, thus simulating in general the mode of connection shown in Fig. 1. The circuit comprising condenser 5, windings 8 of transformer 7 and condenser 10 is tuned to the frequency to be transferred to the alternating current output circuit. The mode of operation of Figs. 2 and 3 is similar to that of Fig. 1 and needs no further explanation.

The arrangement shown in Fig. 4 is useful where it is desired to convert an alternating current of one frequency into a similar current of another frequency. The underlying principle employed in this arrangement consists in coverting the alternating current to a direct current and creating therefrom alternating current of the desired frequency. In the figure, the source 11 of alternating current is connected with the primary winding 12 of transformer 13 having a plurality of secondary windings. One of these windings 14 is connected with the cathode 15 of the tube 16 in order to supply the necessary heating current. In like manner the winding 17 is connected with the cathode 18 of tube 19 for the same purpose. The tubes 16 and 19 are preferably similar to the tube 3 of Fig. 1. A third winding 20 has one terminal connected with the winding 17 and the other terminal with the anode of tube 16. The cathode 15 is connected with the inductance 21, which in turn is connected with the impedance 22 and also with the condenser 23, which serves to hold a large charge of electricity. Another condenser 24 is connected in parallel with condenser 23 between the cathode 15 and the cathode 18. A condenser 25 is connected across the anode and cathode of the tube 19, and the stopping condensers 26 and 27 are connected in series with the alternating current output circuit.

The manner in which the circuit above described functions in order to convert the frequency of an alternating current is as follows: When a potential is applied by the source 11 across the winding 12 of transformer 13, the cathodes 15 and 18 of tubes 16 and 19 will be energized. When the voltage applied to the winding 20 is in such direction as to render the anode of tube 16 positive with respect to the cathode, current will flow through the said tube, and a difference of potential will be created across the condenser 24 and also across the condenser 23 in series with the inductance 21. The tube 16 thus acts as a half-wave rectifier. The application of these rectified impulses to the condenser 23 will gradually build up a large charge across the plates of this condenser. The inductance 21 and the condenser 24 serve as a filter to reduce to a minimum the effects of the alternating component upon the condenser 23 which serves as a reservoir for the direct current impulses. This latter condenser, as will be seen from the drawing, applies its voltage across the electrodes of the tube 19 and also across the plates of condenser 25. When the voltage of condenser 23 becomes sufficiently great to break down the gap of tube 19, oscillations will be set up which will produce an alternating current of the desired frequency for transmission over the output circuit. The manner in which the elements 19, 22 and 25 function to produce an alternating current of the desired frequency is the same as in Fig. 1. The principal difference between the arrangements shown in Figs. 1 and 4 resides in the primary source of energy. Thus in Fig. 1 the direct current source may consist of a battery or a direct current generator. In Fig. 4 the direct current necessary for the operation of the converting apparatus is derived from an alternating current source. The arrangements shown in the figures of the drawing are simply illustrative of some ways for applying the invention. It is, of course, obvious that other and different ways will occur to those skilled in the art.

It will, therefore, be apparent that systems such as have been described, employing a helium filled tube having electrodes of the preferred type mentioned above, constitutes simple and efficient means either for deriving alternating potentials from a direct current potential, or for converting an alternating current from one frequency to another.

While this invention has been disclosed as embodied in a particular form it is to be understood that it is capable of embodiment in other forms without departing from the spirit and scope of the appended claims.

What is claimed is:

1. In a frequency changing system, the combination with a source of alternating current of fixed frequency, of a gas filled tube having an anode and a heated cathode, the said anode being connected with one side of the said source, and the said cathode with the other side, the later connection including a condenser of relatively large capacity to be charged by the rectified impulses produced by the said tube, a second gas filled tube having an anode and a heated cathode effectively connected across said condenser, the anode connection including an impedance, a second condenser bridged across the electrodes of the second tube, and an output circuit connected with the said second condenser, the value of the said impedance being such that the voltage drop therethrough will stop the discharge of the said second tube when the charge taken by the said second condenser reaches a predetermined value, whereby the frequency of the oscillations is controlled.

2. In a frequency changing system, the combination with a source of alternating current of known fixed frequency, of a rectifier connected therewith, a condenser of relatively low capacity connected with the rectifier to be charged thereby, the connection including a filter to substantially eliminate alternating current components of the rectified current, a gas filled tube having an anode and a heated cathode effectively bridged across said condenser, the anode connection including an impedance, a second condenser bridged across the electrodes of the said gas filled tube, and an output circuit connected with the said second condenser, the value of the said impedance being such that the voltage drop therethrough will stop the discharge of the said second tube when the charge taken by the said second condenser reaches a predetermined value, whereby the frequency of the oscillations is controlled.

3. In a frequency changing system, the combination with a source of alternating current, of a transformer having a primary winding connected with the said source and a plurality of secondary windings, a gas filled rectifying tube having its cathode connected across one of said secondary windings to activate said cathode and having its anode connected with one terminal of a second secondary winding, a condenser of relatively large capacity connected with the said rectifying tube, the connection including a filter to smooth out the rectified wave, a second gas filled tube having an anode and a cathode, which electrodes are effectively bridged across the said condenser, the anode connection including an impedance, the cathode being bridged across a third secondary winding of said transformer to which is also connected the other terminal of the said second secondary winding, a second condenser bridged across the electrode of the second tube, and an output circuit connected with the said second condenser, the value of the said impedance being such that the voltage drop therethrough will stop the discharge of the said second tube when the charge taken by the said second condenser reaches a predetermined value, whereby the frequency of the oscillations is controlled.

In testimony whereof, I have signed my name to this specification this 14th day of November, 1924.

WILLIAM H. T. HOLDEN.